United States Patent [19]
Lonnes et al.

[11] 3,969,479
[45] July 13, 1976

[54] ODOR CONTROL METHOD

[75] Inventors: Perry B. Lonnes; Carl M. Peterson, both of St. Paul, Minn.; Dale A. Lundgren, Gainesville, Fla.; Laverne W. Rees, St. Paul, Minn.

[73] Assignee: Environmental Research Corporation, St. Paul, Minn.

[22] Filed: Sept. 11, 1973

[21] Appl. No.: 396,240

Related U.S. Application Data

[63] Continuation-in-part of Ser. No. 167,925, Aug. 2, 1971, abandoned.

[52] U.S. Cl. ............................. 423/210; 423/215.5; 423/224; 423/245; 21/55
[51] Int. Cl.² ..................................... B01D 53/34
[58] Field of Search ............ 423/210, 215.5, 224, 423/245; 21/53, 55, 58

[56] References Cited
UNITED STATES PATENTS

| | | | |
|---|---|---|---|
| 1,664,484 | 4/1928 | Piron | 423/245 |
| 2,683,074 | 7/1954 | Kuehner | 21/53 |

FOREIGN PATENTS OR APPLICATIONS

| | | | |
|---|---|---|---|
| 608,237 | 9/1948 | United Kingdom | 423/224 |
| 1,152,705 | 5/1969 | United Kingdom | 423/224 |

*Primary Examiner*—Earl C. Thomas
*Attorney, Agent, or Firm*—Dorsey, Windhorst, Hannaford, Whitney & Halladay

[57] ABSTRACT

A method for oxidizing odorous constituents of contaminated gas with minimum consumption of the oxidizing agent. Apparatus is disclosed for causing contact between the contaminated gas and the scrubbing liquid by means of opposed flow through a porous bed of packing material. The method is primarily useful in controlling odorous emissions from rendering plants, fish processing plants, asphalt plants, and other plants in which aldehydes, fatty acids, ketones, mercaptans, amines, hydrogen sulfide, sulphur dioxide, nitric oxide, phenols or other pollutants are emitted. Chlorine in the form of sodium hypochlorite in a concentration of 5–50 ppm is the preferred oxidizing agent. Consumption of the oxidizing agent is minimized by continuously purging 1–5% of the scrubbing liquid to thereby promptly remove precipitates and other solids.

8 Claims, 2 Drawing Figures

ODOR CONTROL METHOD

CROSS-REFERENCE TO RELATED APPLICATION

This application is a continuation-in-part of copending application Ser. No. 167,925 filed Aug. 2, 1971, now abandoned, and entitled Odor Control Method.

BACKGROUND OF THE INVENTION

The invention resides in the field of air pollution abatement by oxidation of the objectionable constituents in a gaseous emission. Oxidation is brought about through scrubbing liquid-gas contact in a bed of packing material. The odorous, contaminated gas flows upwardly through the packed bed while the scrubbing liquid, the oxidizing agent in aqueous solution, flows or trickles downwardly over the packed bed.

An aqueous solution of potassium permanganate has long been recognized as an odor controlling agent. The chemical reaction may be expressed generally as follows:

$$2KMnO_4 + H_2O \rightarrow 2KOH + 2MnO_2 + 3O$$

$$O + \text{odorous constituents} \rightarrow HCO_3^-$$

A process based upon potassium permanganate for controlling odors in an environment similar to that contemplated by the present invention is described in an article by Posselt and Reidies entitled "Odor Abatement with Potassium Permanganate Solutions" published by I & CE Product Research and Development, in Volume 4, No. 1, March 1965. Apparatus for achieving scrubbing liquid-gas contact with opposing flow through a bed of packing material is shown in the Blanding U.S. patent (No. 2,321,455) issued on Nov. 25, 1947.

In normal practice a solution of water and dissolved oxidizing agent is pumped to the top of a chamber and then flows by gravity through a packed bed. This scrubbing solution is collected in a holding tank and then recycled through the packed bed. Gases absorbed at the liquid-gas interface are oxidized by the chemical. Unfortunately, organic and other oxidizable particulate matter collected in the liquid are also oxidizable. Since the solution is being recycled, particulate matter consumes oxidizing agent on a continuing basis.

The oxidation of dissolved gases (vapors) present as solutes in the scrubbing solution requires a short time and low concentration of oxidizing agent, whereas the oxidation of suspended solids requires relatively longer times and high concentrations of oxidizing agent. Consequently, the continual recycling of a solution containing excess oxidizing agent and non-purged particulate matter results in needless consumption of the oxidizing agent in the complete oxidation of the particulate matter.

Thus, the problem with the prior art process is cost. The primary cost factor in using a chemical oxidizing agent, where the oxidizing agent is dissolved in the carrier liquid, is the high consumption rate and, therefore, high operating cost due to high consumption of the oxidizing agent. The consumption rate is far in excess of that theoretically necessary to oxidize only the gaseous impurities in the treated air stream being cleaned or purified. An excessive amount of oxidizing agent must be continuously added to oxidize the odorous constituents This high consumption rate of the oxidizing agent makes the economics of operating according to the prior art unattractive.

SUMMARY OF THE INVENTION

The present invention uses a chemical oxidizing agent for the control or reduction of odors and other gases causing air pollution, health problems, nuisances, or damage to plants, animals or materials. The process or method involves operating a gas scrubbing device in such a manner as to maintain overall system efficiency while operating at a minimum chemical-oxidizing agent-consumption rate.

The operating process involves a method of supplying the chemical oxidizing agent so that an amount of oxidizing agent only slightly in excess of the theoretical requirement is actually used to achieve approximately the same system effectiveness. This method of operation reduces the system operating and maintenance costs. An amount of chemical oxidizing agent slightly in excess of that theoretically required to oxidize the gases is continuously metered into the scrubbing liquid inlet line. This procedure leaves but a small fraction of unused oxidizing agent in the scrubbing solution leaving the packed bed. Because the gases react rapidly with the oxidizing agent and the suspended particulate matter reacts slowly, and because there is a relatively short dwell time in the scrubber, the majority of chemical oxidizing agent reacts with the solutes (absorbed gases) and only a small fraction with any suspended particulate matter in the scrubbing liquid. The particulate matter is carried to the bottom of the holding tank and is removed from the tank by the continuous purging of a portion of the scrubbing liquid.

Thus, the present invention provides a method for oxidizing odorous constituents with minimum consumption of the chemical oxidizing agent. The invention comprises passing the odorous gases through a bed of packing material; simultaneously passing an aqueous solution of chemical oxidizing agent over the packing material thereby causing contact between the gas and the aqueous solution; collecting the aqueous solution, precipitates and other solids; purging a quantity of the aqueous solution, precipitates and other solids; and discharging the treated gaseous fluid. The critical step in minimizing the rate of consumption of the oxidizing agent is the continuous purging of the aqueous solution, including precipitates and other solids to thereby prevent excessive use of oxidizing agents by further oxidation of the precipitates and other solids. The range in the quantity of aqueous solution purged is 1–5% by weight of the total quantity of circulating solution.

A fresh aqueous solution of oxidizing agent in an amount slightly greater than the amount theoretically required for oxidizing the absorbed gases (solutes) is continuously added directly to the scrubbing liquid immediately before it flows over the packed bed.

While chlorine in the form of sodium hypochlorite is the preferred oxidizing agent, other oxidizing agents may be used such as sodium and potassium permanganate, ozone, hydrogen peroxide, and other metal hypochlorites.

The present invention has an advantage over prior art processes in that the continuous purging of the chemical reaction precipitates and other solids considerably reduces the quantity of chemical oxidizing agent required. In addition, the process does not require any buffering agents.

The primary object of the present invention is to provide a continuous oxidation process for oxidizing the odorous constituents of a gas, thereby controlling pollution, while at the same time minimizing the rate of consumption of the oxidizing agent.

DESCRIPTION OF THE PREFERRED EMBODIMENT

Figure 1:
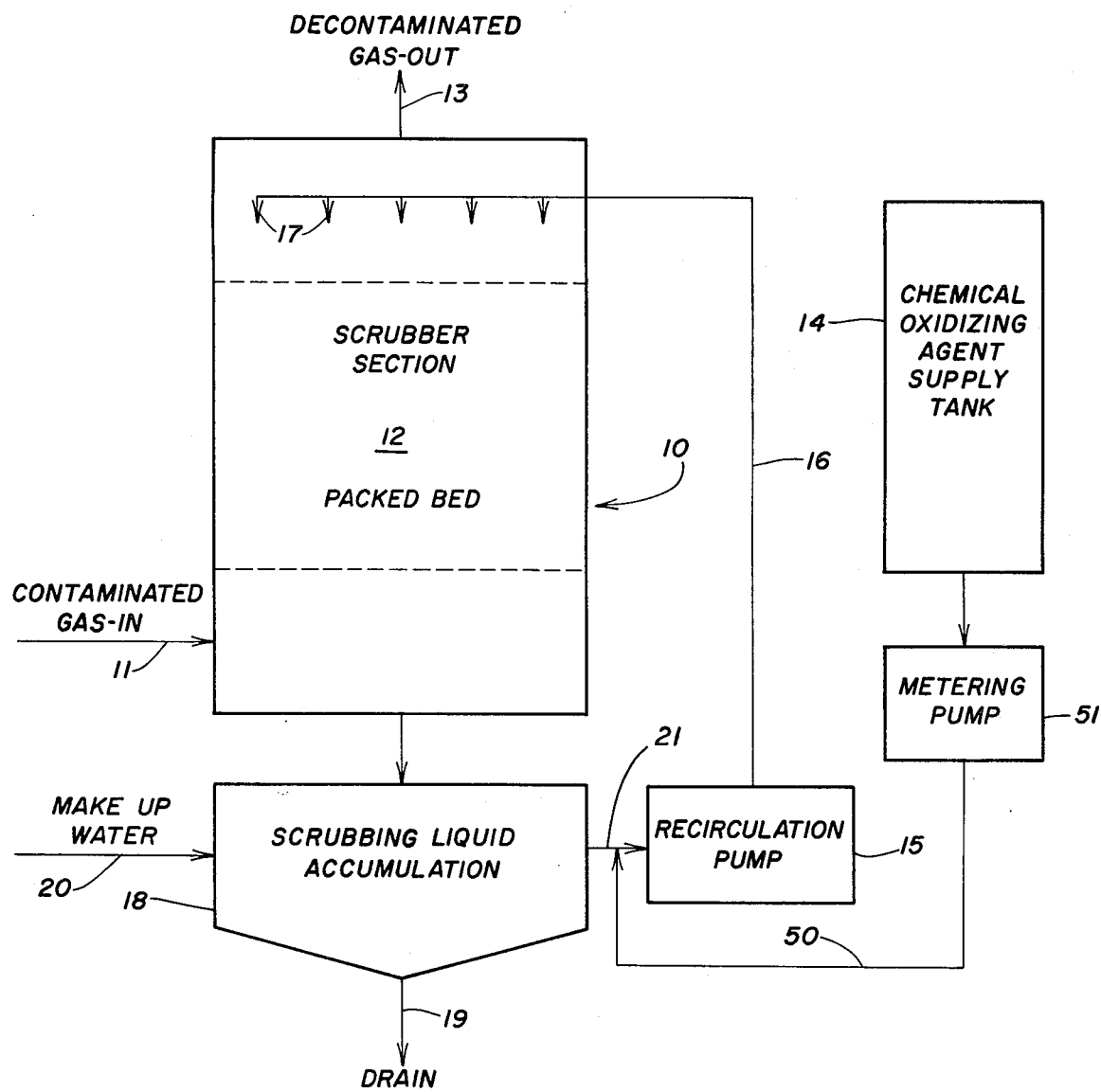
FIG. 1 is a flow sheet showing the general nature of the method which comprises the present invention.

The general nature of the preferred embodiment of the method may be conveniently understood with reference to the flow sheet which comprises FIG. 1. Contaminated gas enters scrubber 10 at gas inlet 11 and passes through packed bed 12 of packing material where the odorous constituents are oxidized. The decontaminated gas is discharged from scrubber 10 at gas outlet 13. An aqueous solution of chemical oxidizing agent is prepared in supply tank 14 and circulated by means of pump 15 through scrubbing liquid line 16 and is discharged in the form of a spray at nozzles 17 above packed bed 12. The aqueous solution of chemical oxidizing agent flows downwardly over packed bed 12 as the contaminated gas flows upwardly, thus causing a contact in the conventional manner between gaseous fluid and the aqueous solution to bring about oxidation of the odorous constituents. Spent scrubbing liquid, as well as chemical reaction precipitates and other solids, are collected in scrubbing liquid holding tank 18. A portion of the spent scrubbing liquid is continuously drained from the scrubbing liquid holding tank 18 and line 19. The amount of scrubbing liquid drained is preferably within the range of 1–5 % by weight of the total quantity of circulating solution. Expressed in terms of quantity of scrubbing liquid purged with respect to the flow rate of the contaminated gas, the purge rate is 1–2 gallons per 10,000 CFM of gas. Makeup water is added to scrubbing liquid holding tank 18 at 20. Spent scrubbing liquid is recirculated from scrubbing liquid holding tank 18 through line 21.

While chlorine in the form of sodium hypochlorite is the preferred oxidizing agent, other oxidizing agents including sodium and potassium permanganate, ozone, hydrogen peroxide, and other metal hypochlorites may be used. In certain installations for treatment of formaldehyde, hydroxide ions alone may serve as the oxidizing agent, and the typical source is sodium hydroxide.

With potassium permanganate as the oxidizing agent, the concentration of the scrubbing liquid should be within the approximate range of 0.001 to 0.01 percent. The concentration of potassium permanganate in the oxidizing agent supply tank should preferably be in the range of ½–4%. With sodium hypochlorite as the oxidizing agent, the concentration of the scrubbing liquid should be within the approximate range of 5–50 ppm, and preferably in the range of 5–25 ppm. The concentration of sodium hypochlorite in the oxidizing agent supply tank and the feed rate should be in the range of ¼–1 gallon of a 15% solution of sodium hypochlorite per 10,000 CFM of contaminated gas at a feed rate of 100 gpm of scrubbing liquid.

The scrubbing liquid should be alkaline, i.e., the pH should be in the range of 7.5 to 10.0. With sodium hypochlorite as the oxidizing agent, no buffer is necessary.

The temperature of the scrubbing liquid should lie within the range of 60°–160°F.

The packing material comprising packed bed 12 may range widely in substance, size and density. A suitable substance may be obtained from Koch Engineering Company, New York, N.Y. under the trademark FLEXIRINGS.

Figure 2:
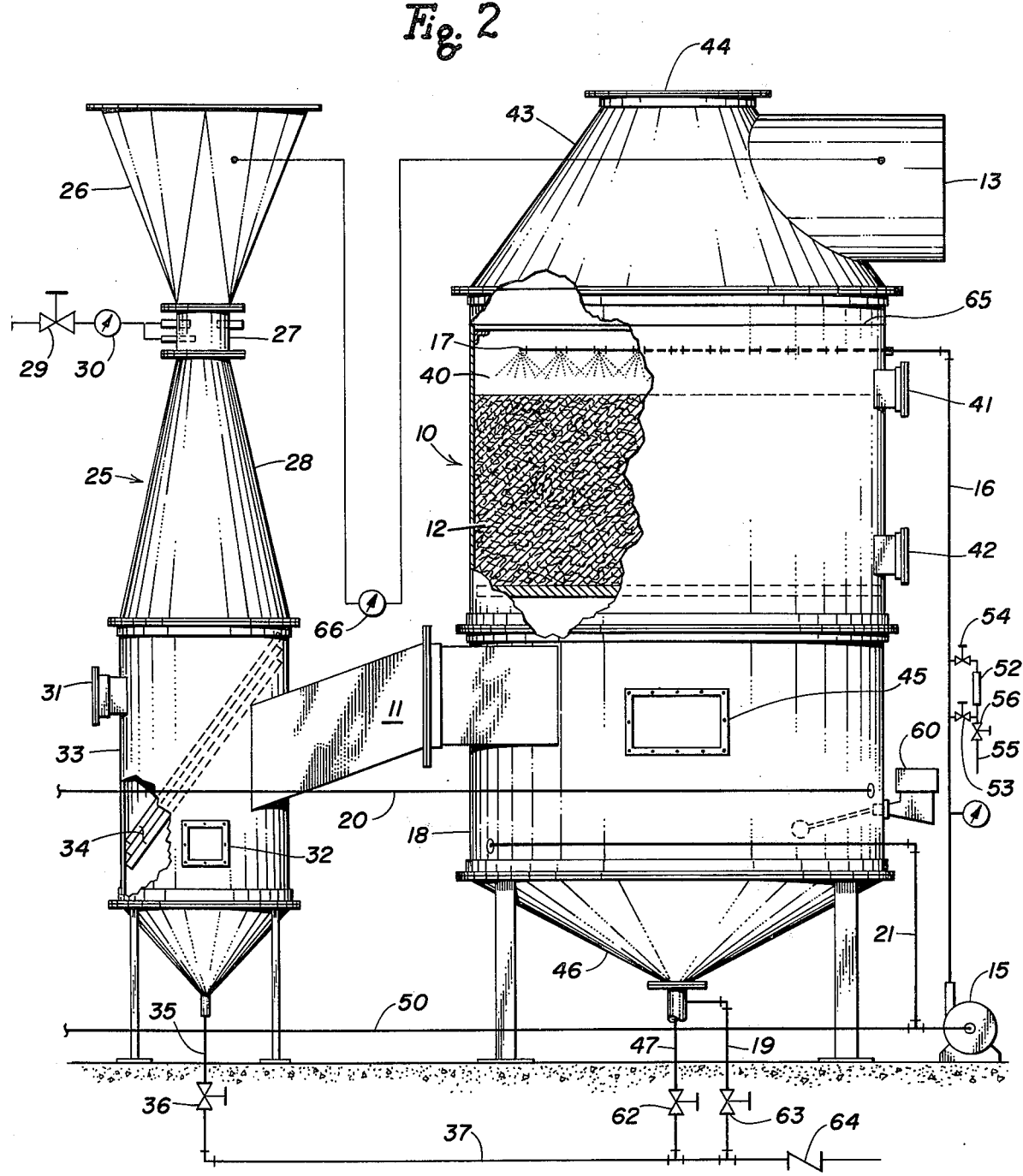
FIG. 2 is a side view of apparatus which may be used in carrying out the invention.

Apparatus for carrying out the method described above is shown in FIG. 2. In addition to scrubber 10, FIG. 2 shows a venturi scrubber section 25 which, while not a critical part of the present invention, may be used for particulate removal, cooling, and odor absorption in certain installations. Venturi scrubber 25 includes a converging section 26, a throat section 27 and a diverging section 28. Odorous gas enters section 26, flows downwardly and eventually leaves scrubber 25 and flows into scrubber 10 through inlet 11. Tap water is fed into neck section 27 at the rate of approximately 2 to 10 gallons per minute per 1,000 cubic feet per minute of gas flow. The water flow is controlled by valve 29 and measured by flowmeter 30. Access doors 31 and 32 provide access to demister section 33 which includes demisters 34. Spent water is collected and drained from venturi scrubber 25 through drain line 35 which is controlled by valve 36 leading to main drain line 37.

Venturi scrubber section 25 serves to remove particulate matter from the gas being treated, cools the gas in the event that the gas is at an elevated temperature, and removes a significant amount of the odor simply by absorption in the water. In applications where there is very little particulate matter in the gas, where the gas is not at an elevated temperature, and where the odor problem is not particularly great, venturi scrubber 25 may be eliminated and odorous gas may be fed from the source directly into scrubber 10 at inlet conduit 11.

Scrubber 10 includes packed bed 12 which is located below the section where the nozzles 17 are located. Access doors 41 and 42 are provided for access to void area 40 and nozzles 17, and packed bed 12, respectively. The upper section of scrubber 10 includes a demister 65 and a converging hood 43 communicating with outlet conduit 13 and which includes access door 44. Scrubbing liquid holding tank section 18 is provided with access door 45 and has a conical lower section 46 leading to drain line 47 as well as line 19.

Odorous gas leaves venturi scrubber section 25 and enters scrubber section 10 through conduit 11, flows upwardly through packed bed 12 into conical hood section 43 and out conduit 13.

Chemical oxidizing agent is fed into scrubber 10 through line 50 from a chemical oxidizing agent supply tank 14 (shown schematically in FIG. 1) and metering pump 51 (also shown schematically in FIG. 1). Newly supplied oxidizing agent solution is circulated by recirculating pump 15, along with a portion of the spent scrubbing liquid drained in line 21 from scrubbing liquid holding tank 18. The mixture is recirculated in line 16 and is sprayed into scrubber 10 at nozzles 17 which are disposed in a circular arrangement in area 40. Line 16 includes sight glass 52 through which a portion of the flow in line 16 may be conducted by adjustment of valves 53 and 54. Drain line 55 with valve 56 allows a small portion of the flow line 16 to be tapped for analysis. Sight glass 52 serves as a visual check of the concentration of the chemical oxidizing agent solution circulating in line 16 because, as is well known, an aqueous solution of potassium permanganate is purple with the color intensity varying with the concentration.

Water is added to scrubbing liquid holding tank 18 through line 20. The amount of water added is controlled by liquid level flow control 60 which controls a solenoid or motorized valve (not shown) in line 20.

Drain line 47 with valve 62 leads from the lowermost point of holding tank 18 to main drain line 37. Line 47 is preferably about 4 inches in diameter as compared to drain line 19, which is approximately 1 inch in diameter. Drain line 47 with valve 62 is used only in flushing or cleaning scrubber 10. Valve 62 is closed during normal operation.

Drain line 19 is the line through which a portion of the spent scrubbing liquid is continuously purged from the system. Valve 63 is adjusted so that 1–5% of the circulating scrubbing liquid is continuously purged. This purging also removes settled precipitates and solid matter and is a critical step in the practice of the method of the present invention.

Check valve 64 is provided in main drain line 37 to prevent backup.

Pressure differential gauge 66 measures pressure differential between a point in venturi scrubber inlet section 26 and outlet conduit 13 to detect excessive pressure drop in the system.

The foregoing method oxidizes the odorous constituents of a contaminated gas with a minimum consumption of oxidizing agent. The method is a meaningful contribution to the economic abatement of objectionable odors and represents a factor in decreasing man's pollution of his environment.

Having thus described the invention, the following is claimed:

1. In a method for oxidizing constituents of a gaseous fluid with minimum consumption of chemical oxidizing agent which comprises:
   passing the odorous gaseous fluid through a bed of packing material contained in a scrubber;
   simultaneously passing an aqueous solution of a predetermined concentration of chemical oxidizing agent selected from the group consisting of $NaClO_2$, $Cl_2$, $KMnO_4$, $NaMnO_4$, $O_3$, and $H_2O_2$ through the packing material to thereby cause contact between the gaseous fluid and the aqueous solution, oxidation of the odorous constituents and precipitation of solid chemical reaction products; and
   discharging the treated gaseous fluid from the scrubber;
the improvement comprising:
   passing the aqueous solution containing the solid precipitates into a holding tank disposed at an elevation lower than the scrubber;
   accumulating by gravity the solid precipitates at the bottom of the holding tank;
   purging a quantity of the accumulated solid precipitates, the quantity comprising 1–5% by weight of the total amount of circulating aqueous solution, from the bottom of the holding tank;
   introducing water to the holding tank above the level of the accumulated solid precipitates therein;
   pumping the aqueous solution, with the added water, from the holding tank from a point above the level of the accumulated solid precipitates through a line terminating in the scrubber above the bed of packing material;
   adding fresh oxidizing agent to the line at a point intermediate the holding tank and scrubber in a controlled amount, wherein the amount of fresh oxidizing agent added to the line and the amount of water added to the holding tank maintain the predetermined concentration of the aqueous solution.

2. The method of claim 1 wherein the predetermined concentration of chemical oxidizing agent is maintained at a value slightly greater than that required to oxidize the absorbed gas (solutes).

3. The method of claim 1 wherein the oxidizing agent is $NaClO_2$.

4. The method of claim 3 wherein the quantity of dissolved $NaClO_2$ passing over the packing material is aproximately ¼–1 gallon of a 15% solution per 10,000 CFM of contaminated gas per 100 gpm of circulating solution.

5. In a method for oxidizing odorous constituents of a gaseous fluid containing solid organic matter suspended therein with minimum consumption of chemical oxidizing agent which comprises:
   passing the odorous gaseous fluid with suspended solids through a bed of packing material contained in a scrubber;
   simultaneously passing an aqueous solution of a predetermined concentration of chemical oxidizing agent selected from the group consisting of $NaClO_2$, $Cl_2$, $KMnO_4$, $NaMnO_4$, $O_3$, and $H_2O_2$ through the packing material to thereby cause contact between the gaseous fluid and the aqueous solution, oxidation of the odorous constituents, precipitation of solid chemical reaction products and separation of other solids; and
   discharging the treated gaseous fluid from the scrubber;
the improvement comprising:
   passing the aqueous solution containing the solid precipitates and other solids into a holding tank disposed at an elevation lower than the scrubber;
   accumulating by gravity the solid precipitates and other solids at the bottom of the holding tank;
   continuously purging a quantity of the accumulated solid precipitates and other solids, the quantity comprising 1–5% by weight of the total amount of circulating aqueous solution, from the bottom of the holding tank;
   introducing water to the holding tank above the level of the accumulated solid precipitates and other solids therein;
   pumping the aqueous solution, with the added water, from the holding tank from a point above the level of the accumulated solid precipitates and other solids through a line terminating in the scrubber above the bed of packing material;
   adding fresh oxidizing agent to the line at a point intermediate the holding tank and scrubber in a controlled amount, wherein the amount of fresh oxidizing agent added to the line and the amount of water added to the holding tank maintain the predetermined concentration of the aqueous solution.

6. The method of claim 5 wherein the predetermined concentration of chemical oxidizing agent is maintained at a value slightly greater than that required to oxidize the absorbed gas (solutes).

7. The method of claim 5 wherein the oxidizing agent is $NaClO_2$.

8. The method of claim 7 wherein the quantity of dissolved $NaClO_2$ passing over the packing material is approximately ¼–1 gallon of a 15% solution per 10,000 CFM of contaminated gas per 100 gpm of circulating solution.

* * * * *